(12) United States Patent
Ervin et al.

(10) Patent No.: US 6,684,502 B2
(45) Date of Patent: Feb. 3, 2004

(54) METHOD AND APPARATUS FOR ALIGNING A CIRCULAR RECUPERATOR CORE

(75) Inventors: Douglas R. Ervin, Metamora, IL (US); Leonard Holman, Chula Vista, CA (US); Robert M. Jones, Metamora, IL (US)

(73) Assignee: Solar Turbines Inc, San Diego, CA (US)

( * ) Notice: Subject to any disclaimer, the term of this patent is extended or adjusted under 35 U.S.C. 154(b) by 151 days.

(21) Appl. No.: 10/053,203

(22) Filed: Nov. 9, 2001

(65) Prior Publication Data

US 2003/0088982 A1 May 15, 2003

(51) Int. Cl.[7] ................................................ B23P 15/00
(52) U.S. Cl. ..................................... 29/890.034; 29/464
(58) Field of Search ........................... 29/890.034, 464, 29/726, 33 G, 33 P; 165/165, 166, 125; 60/39.511

(56) References Cited

U.S. PATENT DOCUMENTS

| | | | | |
|---|---|---|---|---|
| 5,060,721 A | | 10/1991 | Darragh | |
| 5,081,834 A | * | 1/1992 | Darragh | 60/39.511 |
| 5,918,368 A | * | 7/1999 | Ervin et al. | 29/890.03 |
| 6,112,403 A | * | 9/2000 | Ervin et al. | 29/726 |
| 6,158,121 A | * | 12/2000 | Ervin et al. | 29/890.034 |
| 6,308,409 B1 | * | 10/2001 | Bucey et al. | 29/890.034 |
| 6,357,113 B1 | * | 3/2002 | Williams | 29/890.034 |
| 2002/0133949 A1 | * | 9/2002 | Bucey et al. | 29/890.034 |
| 2003/0079326 A1 | * | 5/2003 | Bucey et al. | 29/407.05 |
| 2003/0079345 A1 | * | 5/2003 | Bucey et al. | 29/890.034 |

\* cited by examiner

*Primary Examiner*—I Cuda Rosenbaum
(74) *Attorney, Agent, or Firm*—Larry G Cain

(57) ABSTRACT

A method for aligning a circular core. The method has a work station which defines an inner chucking portion being movable between a lower position and an upper position and a retracted position and an expanded position. The work station defines an upper portion being movable between a first position and a second position and a loading position and a clamping position. The clamping position has a plurality of positions. The circular core being aligned during at least a portion of the plurality of positions. And, the work station having a welding station.

9 Claims, 6 Drawing Sheets

METHOD AND APPARATUS FOR ALIGNING A CIRCULAR RECUPERATOR CORE

TECHNICAL FIELD

This invention relates generally to a heat exchanger or more particularly to a recuperator and more particularly to a method for aligning a circular recuperator core.

BACKGROUND

Many gas turbine engines use a heat exchanger or recuperator to increase the operation efficiency of the engine by retracting heat from the exhaust gas and preheating the intake air. Typically, a recuperator for a gas turbine engine must be capable of operating at temperatures of between about 500 degrees C. and 700 degrees C. and internal pressures of between approximately 450 kPa and 1400 kPa under operating conditions involving repeated starting and stopping cycles.

Many recuperators are of a primary surface construction. In a primary surface recuperator, a plurality of sheets are stacked in a spaced apart configuration to form a cell. The spacing therebetween form a plurality of donor passages and a plurality of recipient passages. In many operations, the hot exhaust gas is passed through the donor passages and an atmospheric temperature intake air is passed through the recipient passages. Heat from the hot exhaust is transferred through the sheet and absorbed by the cooler intake air. Thus, thermal energy from the exhaust gas is extracted and conducted to the intake air increasing the efficiency of the engine.

In many applications the primary surface sheet used in forming the cell is very thin, flimsy and difficult to maintain a uniform cross sectional area of the passages between sheets. To enhance the rigidity of the thin sheets, the sheets are formed into an accordion type configuration forming peaks or crests and valleys forming a plurality of upwardly and downwardly opening, transversely extending, relatively deep grooves being relatively closely spaced and having substantially vertical side walls or fins. In forming a recuperator using such sheets, the peeks of alternate sheets are aligned and the valleys of alternate sheets are aligned to form the donor passages and the recipient passages. Additionally, many of the sheets are formed with a serpentined configuration to enhance a controlled turbulent which increases heat conductivity and resulting efficiency. In manufacturing such recuperators, the component parts are fixedly attached together by a welding process to prevent leakage from the respective donor passages and recipient passages.

U.S. Pat. No. 5,060,721 issued on Oct. 29, 1991 to Charles T. Darragh discloses an example of one such recuperator. The recuperator disclosed in this patent has a circular configuration. The recuperator has a plurality of cell made from a pair of primary surface sheets, a plurality of spacer bars and a plurality of guide strips. The component parts are welded together to form the recuperator. The welding of these thin sheet and component parts into a cell having a sealed interface is difficult to accomplish in a cost effective and efficient manner.

During the assembly of the cells and the recuperator, the interface of the components are positioned one with respect to another in a preestablished relationship and are welded together. The effectiveness of the positioning and holding process during the welding process used to form the cells is in many instances dependent on the ability to maintain the relationship of the components one to another. The result of maintaining the components relationship may results in a defective cell. For example, in some defective cells the components relationship can result in defective welding and leakage between the donor side and the recipient side. Thus, an effective and efficient process is needed to insure the position and location of the component relationship prior to final welding and during assembly.

The present invention is directed to overcome one or more of the problems as set forth above.

SUMMARY OF THE INVENTION

In one aspect of the invention a method of aligning a plurality of cells forms a recuperator core. The recuperator core has a circular configuration and defines an axis "A" about which is formed an inner diameter "ID" and an outer diameter "OD". A method of aligning comprises positioning an inner sealing ring about an inner chucking portion; aligning a first end of the inner sealing ring with an end of the inner chucking portion; expanding the inner chucking portion into an expanded position maintaining the first end of the inner sealing ring flush with the end of the inner chucking portion, the inner sealing ring being centered about the axis "A"; positioning an upper portion about the inner chucking portion, the upper portion being in a loading position; positioning a preestablished quantity of the plurality of cells within the upper portion in a preestablished relationship; and moving the upper portion from the loading position to a clamping position and properly aligning each of the plurality of cell one to another.

DETAILED DESCRIPTION

Figure 1:
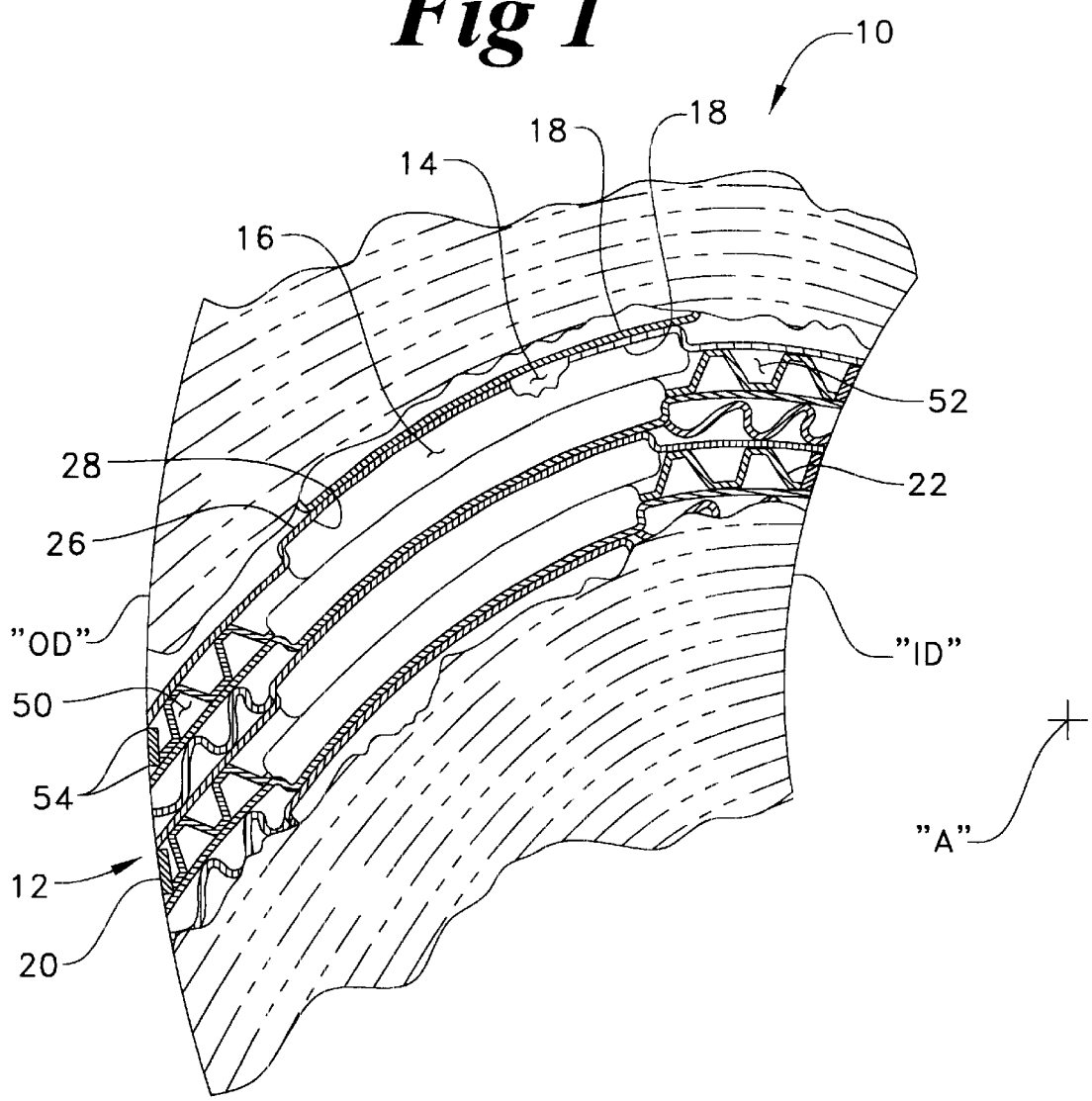
FIG. 1 is a sectional view of a recuperator core taken through a plurality of cells.

As best shown in FIG. 1, a circular recuperator core 10 is formed from a plurality of cells 12. The recuperator core 10 has a plurality of donor passages 14 and a plurality of recipient passages 16 defined therein. Each of the plurality of cells 12 is made from a plurality of primary surface sheets 18. A plurality of spacer bars 20 and a plurality of guide vanes 22 are also used in making the cell 12.

Figure 2:
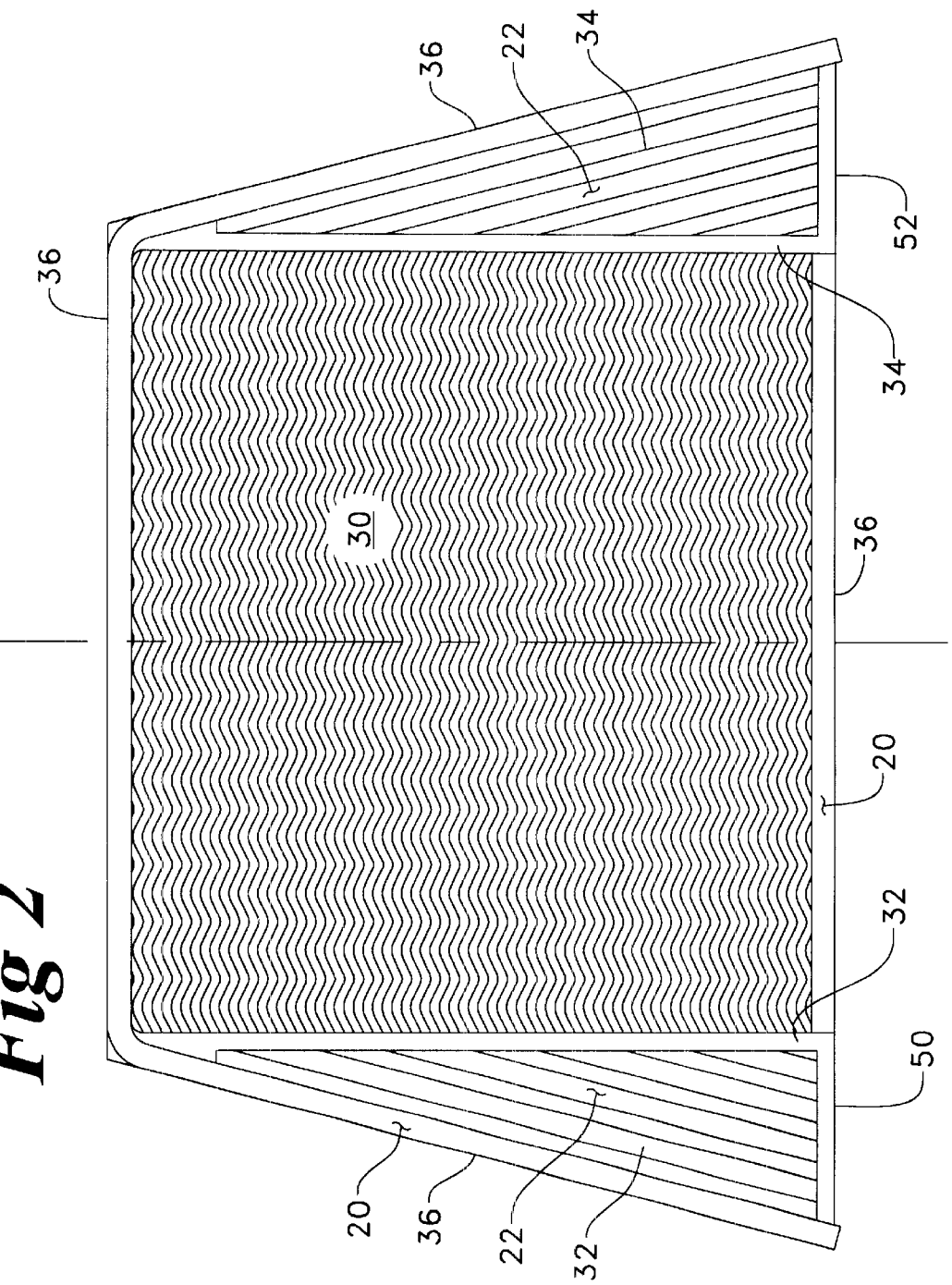
FIG. 2 is a view of one of the plurality of cells partially assembled and used in making the recuperator core.

As best shown in FIGS. 1 and 2, each of the pair of primary surface sheets 18 is pleated and defines a donor side 26 and a recipient side 28. Each of the plurality of primary surface sheets 18 has a center portion 30, a first wing portion 32 and a second wing portion 34. In this application, the center portion 30 has a preformed serpentined trapezoidal configuration and each of the first and second wing portions 32, 34 has a flattened triangular configuration. As an alternative, other configurations could be used without changing the jest of the invention. Each of the plurality of primary surface sheets 18 define a plurality of edges 36. The plurality of spacer bars 20 are position on the primary surface sheet 18 alone the respective one of the plurality of edges 36 in a plurality of precise preestablished locations. As shown in FIG. 1, one of the pair of primary surface sheets 18 on the recipient side 28 has the recipient inlet guide vane 22 attached thereto in the first wing portion 32 in a precise preestablished location. And, the same one of the pair of primary surface sheets 18 on the recipient side 28 has the recipient outlet guide vane 22 attached thereto in the second wing portion 34. Interposed the first wing portion 32 of the pair of primary surface sheets 18 is a recipient inlet passage 50 and interposed the second wing portion 34 of the pair of primary surface sheets 18 is a recipient outlet passage 52. A plurality of welds, not shown, are used to complete the assembly of each of the plurality of cells 12. And, the plurality of cells 12 are further assembled into the recuperator core 10, such as by welding. During the manufacturing of the plurality of cells 12, each of the plurality of cells 12 is formed in an arcuate configuration prior to being assembled into the circular recuperator core 10 having an axis "A" about which is defined an inner diameter portion "ID" and an outer diameter portion "OD".

Figure 3:
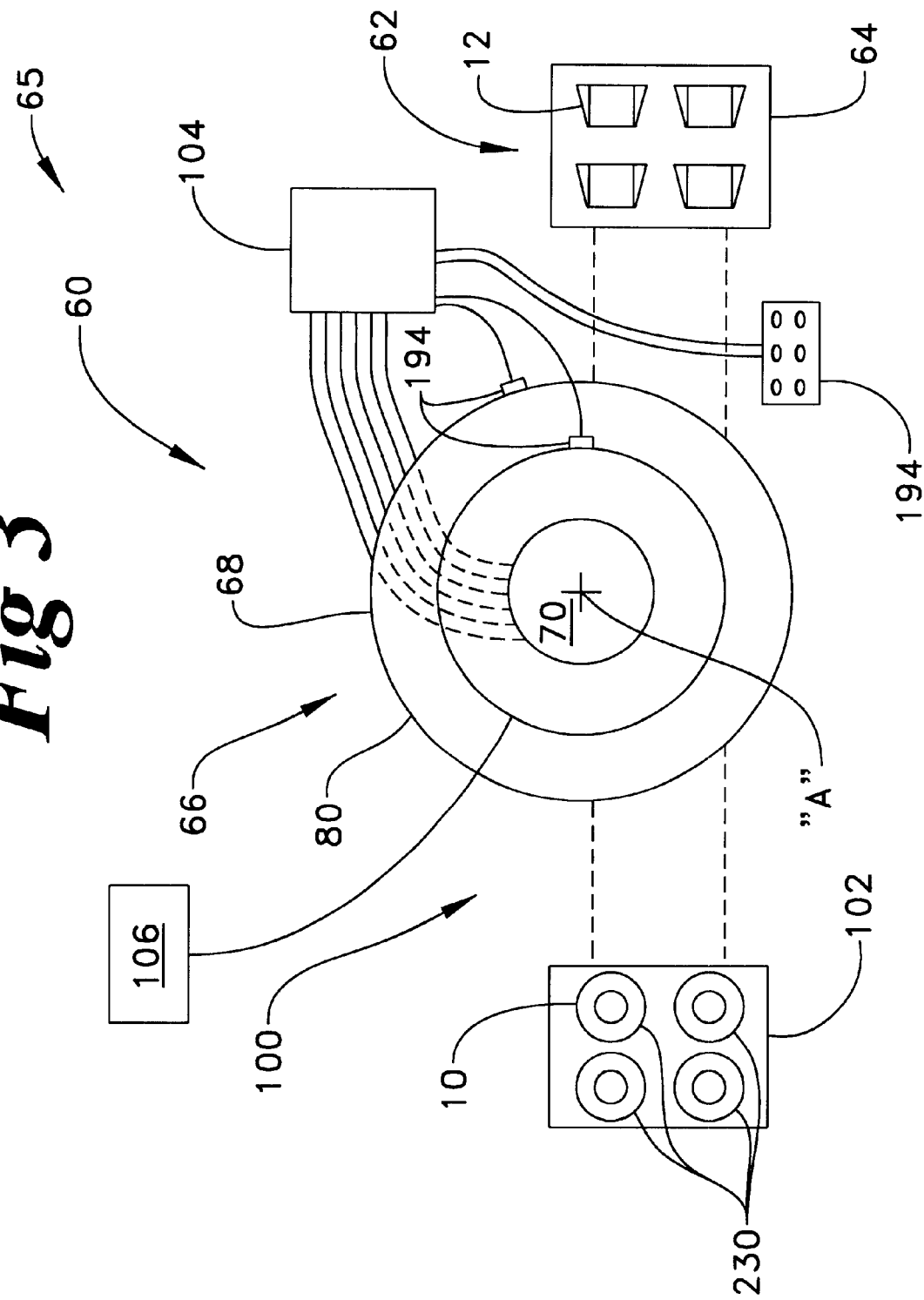
FIG. 3 is a schematically representation of a manufacturing system or line.

As shown in FIG. 3, a manufacturing system 60 is used to manufacture the recuperator 10. The system 60 has an input end 62 having a tub or container 64 in which is positioned the plurality of cells 12 in a finished configuration. The system 60 also has a control system 65, as will be defined latter, and an assembly station 66 centered about an axis which during the manufacturing of the circular recuperator core 10 coincides with the axis "A" of the recuperator 10. The assembly station 66 includes a table 68. The table 68 has a lower or inner chucking portion 70 which is movable between a lower position 72, best shown in FIG. 4, and an upper position 74, best shown in FIG. 5. The table 68 also has an upper portion 80 which has a stacking portion 82 being movable between a loading position 84, best shown in phantom in FIG. 6, and a clamping position 86. The clamping position 86 is movable between a low pressure clamping position, a medium pressure clamping position and a high pressure clamping position, not shown.

The system 60 has an output end 100 having a tub or container 102 in which is positioned the plurality of cells 12 after being welded. The system 66 further has a source of hydraulic pressure 104 operationally connected within the system 60 and the work station 66, and a welding station or portion 106 operatively connected therewith.

The upper portion 80 of the table 68 is also rotatable between a first position 110 having a first side 112 of the upper portion 80 up and a second position 114 having a second side 116 of the upper portion 80 up. The upper portion 80 is moved between the first position 110 and the second position 104 by a pair of motors 118. As an alternative, a single motor could be used. The upper portion 80 is lockable in each of the first position 110 and the second position 114. The clamping position 86 is movable between the low pressure clamping position, the medium pressure clamping position and the high pressure clamping position by a plurality of cylinders 120. As an alternative a single cylinder and linkage could be used in place of the plurality of cylinders 120, best shown in FIG. 6.

Figure 4:
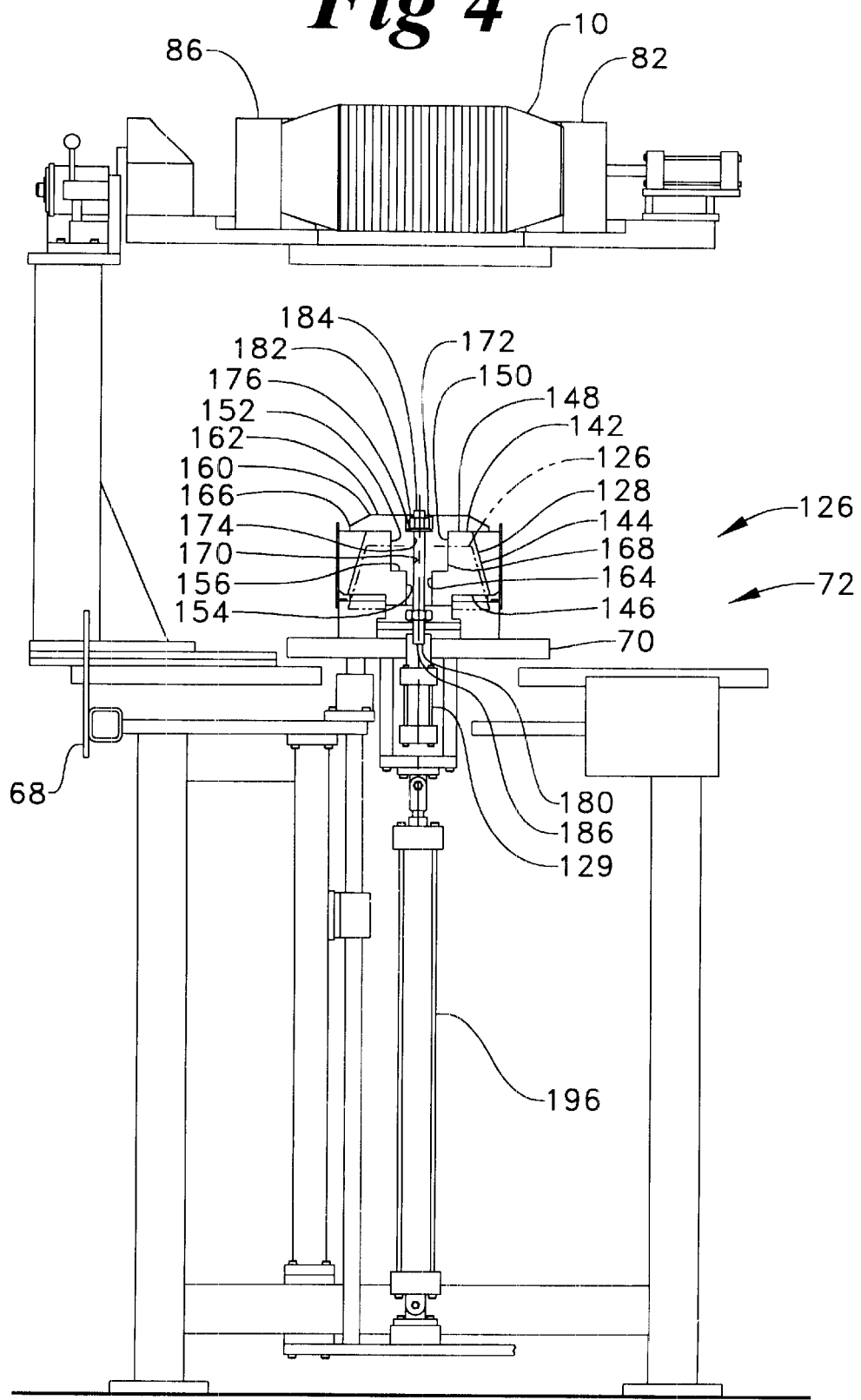
FIG. 4 is a side view of a work station of the manufacturing system in a down position.

The lower or inner chucking portion 70 is expandable between a retracted position 126, shown in phantom in FIG. 4, and an expanded position 128. The lower or inner chucking portion 70 is moved between the retracted position 126 and the expanded position 128 by a cylinder 129. For example, as further shown in FIG. 5, the lower or inner chucking portion 70 is made up of an outer multipiece cylindrical member 130 having a plurality of segmented members 132 centered about an axis. In this application the multipiece cylindrical member 130 has six (6) evenly configured segments 132. The multipiece cylindrical member 130 has a cylindrical outer diameter defining a contracting surface 134 having a predetermined diameter. In this application, the contacting surface 134 is an arcuate surface, but as an alternative the contacting surface 134 could include a plurality of contacting fingers of surfaces. An inner cylindrical diameter 136 has a frustoconical configuration defining a major diameter at a first end 138 of the multipiece cylindrical member 130 and a minor diameter at a second end 140 of the multipiece cylindrical member 130. The inner chucking portion 70 has an inner frustoconical member 142 positioned within the multipiece cylindrical member 130. The inner frustoconical member 142 has a frustoconical outer configuration 144 defining a major diameter at a first end 146 of the inner frustoconical member 142 and a minor diameter at a second end 148 of the inner frustoconical member 142. The inner frustoconical member 142 has a stepped bore 150 centered about and axis extending between the first end 146 and the second end 148. The stepped bore 150 has a large bore 152 extending from the second end 148 toward the first end 146 a preestablished distance and a small bore 154 extending from the first end 146 toward the second end 148 and intersecting with the large bore 152 at a base line 156. The inner chucking portion 70 has a top member 160 positioned partially within the larger bore 152 of the inner frustoconical member 142. The top member 160 defines a first end 162 and a second end 164. The top member 160 has a hat type configuration including a brim portion 166 located at the first end 162 and has a preestablished diameter being greater than the diameter of the large bore 152 of the inner frustoconical member 142. The brim portion 166 is positioned in contacting relationship with the first end 146 of the inner frustoconical member 142. A hat portion 168 is located at the second end 164 and extends to the brim portion 166 a preestablished distance. The top member 160 has a bore 170 center about an axis of the top member 160 extending between the first end 162 and the second end 164. In this application, the bore 170 has a stepped configuration and included a large bore 172 located at the first end 162 and extends toward the second end 164. A small bore 174 is located at the second end 164, extends toward the first end 162 and intersects with the large bore 172 at a base 176. A threaded member 180, in this application a stud, has a nut 182 threadedly engaged with a first end 184 of the threaded member 180 and a second end 186 is threadedly attached to the cylinder 129.

As shown in FIG. 4, an operator has actuates the control system 65, one of a plurality of safety switches and switches 194 and a cylinder 196. The cylinders 196 moves the lower or inner chucking portion 70 into the lower position 72 and the cylinder 196 moves the lower or inner chucking portion 70 into a down position 198.

Figure 5:
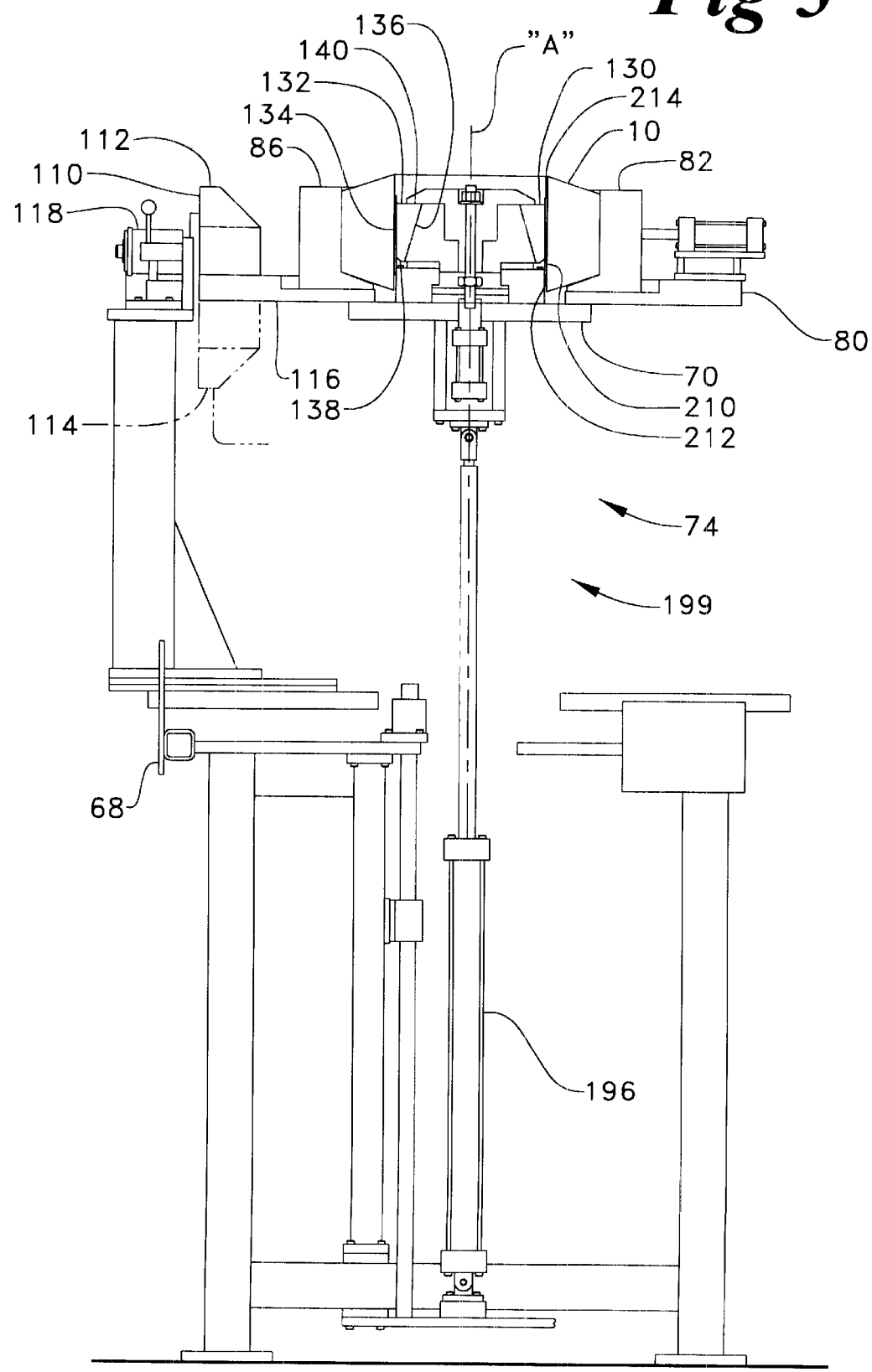
FIG. 5 is a side view of a work station of the manufacturing system in an extended position.

As shown in FIG. 5, another one of the plurality of switches 194 actuates the cylinders 196 into an extended or up position 199 with the lower or inner chucking portion 70 in the upper position 74. The upper portion 80 of the table 68 is constructed of a plurality of segments 200 which are movably actuated about the axis by the operator controlling another one of the plurality of switches 194 which actuates the plurality of cylinder 120. With the plurality of cylinders 120 in a retracted position, not shown, the plurality of segments 200 have a space "S" therebetween and the stacking portion 82 of the upper portion 80 of the table 68 is in the loading position 84. With the plurality of cylinders 120 in an extended position 204, the stacking portion 82 of the upper portion 80 of the table 68 is in the clamping position 86 and depending on the one of the plurality of switches 194 actuated by the operator the pressure applied to the plurality of cylinders 120 is in one of the low pressure, medium pressure and high pressure positions. And, the space "S" between the plurality of segments 200 varies depending on the pressure from a large space "S" to a minimal space "S" respectively.

As further shown in FIG. 5, an inner sealing member or ring 210 is positioned about the lower or inner chucking portion 70. The inner sealing ring 210 has a generally cylindrical configuration which extends between a first end 212 and a second end 214. The inner sealing ring 210 has a preestablished thickness, a preestablished inner diameter and a preestablished outer diameter. The inner sealing ring 210 has the first end 212 positioned flush with the end 138 of the multipiece cylindrical member 130. The end 138 of the multipiece cylindrical member 130 has a plurality of recesses 218 therein. In this application, there are six equally spaced recesses 218 positioned at the interface of the plurality of segmented member 132. By actuating one of the plurality of switches 194, the lower or inner chucking portion 70 is positioned in the upper position 74 and in the expanded position 128 maintaining the inner sealing ring 210 flush with the end 138, centering the inner sealing ring 210 about the axis "A", and maintaining the generally cylindrical configuration of the inner sealing ring 210.

Figure 6:
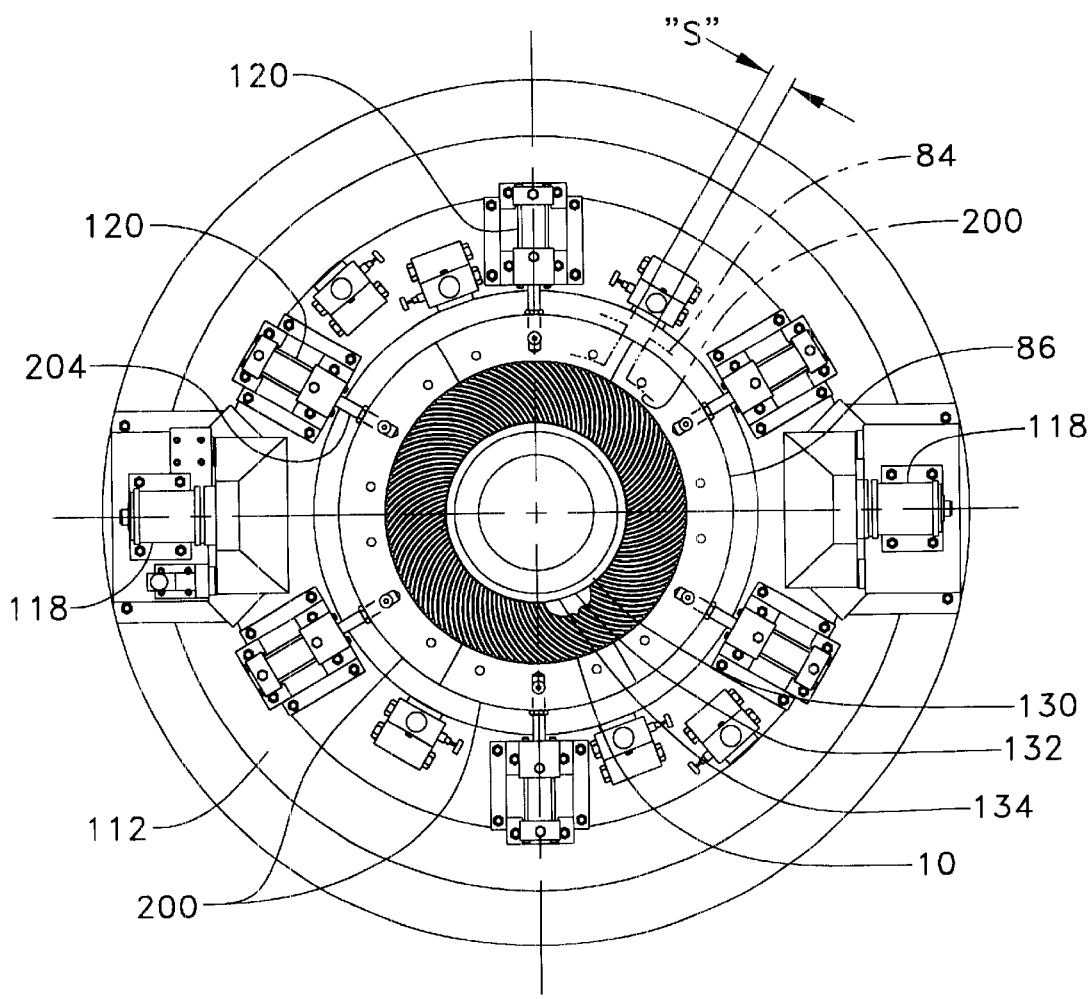
FIG. 6 is a top view of the work station of the manufacturing system.

A portion of a predetermined quantity of the plurality of cells 12 are positioned randomly within the upper portion 80 at the loading position 84 in a preestablished relationship. As shown in FIG. 6, another of the plurality of switches 194 is actuated and the upper portion 80 of the table 68 is moved into the clamping position 86. With the proper one of the plurality of switches 194 actuated, the low pressure clamping position of the clamping position 86 is actuated and the space "S" between the plurality of segments 200 is reduced. The operator views the position of the plurality of cells 12 insuring proper alignment. And, if the plurality of cells 12 are not properly aligned the operator properly aligns the plurality of cells 12 such as by tapping with a soft hammer. Next, the operator actuates the proper one of the plurality of switches 194 actuating the medium pressure clamping position of the clamping position 86. Thus, the space "S" between the plurality of segments 200 is further reduced. Again, the operator views the position of the plurality of cells 12 insuring proper alignment. And, if the plurality of cells 12 are not properly aligned the operator properly aligns the plurality of cells 12 such as by tapping with a soft hammer. And, the operator actuates the proper one of the plurality of switches 194 actuating the high pressure clamping position of the clamping position 86 is actuated and the space "S" becomes minimal. The operator views the position of the plurality of cells 12 insuring proper alignment. And again, if the plurality of cells 12 are not properly aligned the operator properly aligns the plurality of cells 12 such as by tapping with a soft hammer. If during the steps of actuating the low pressure clamping position, the medium pressure clamping position and the high pressure clamping position the plurality of cells 12 will not properly align, the operator reduces the pressure and repeats the appropriate step or steps from low pressure clamping position, medium pressure clamping position and high pressure clamping position. In this application, the motor 118, the plurality of cylinders 120, the cylinder 129 and the cylinder 196 are hydraulically actuated but as an alternative can use a pneumatic or other source of pressure.

The circular recuperator core 10 is properly welded, removed and placed on the output end 100 in the tub 102.

A retainer or a plurality of retainers 230 can be placed about the outer diameter portion "OD" of the plurality of cells 12 after the welding has been completed to structurally maintain the recuperator core 10 in tack.

The structural integrity and preestablished configuration of the circular recuperator core 10 is maintained by using the manufacturing system 60. For example, the predetermined quantity of individual arcuate plurality of cells 12 are loosely position in the upper portion 80 of the table 68 about the inner sealing ring 210 and the lower or inner chucking portion 70. The upper portion 80 is systematically moved into the clamping position 86 and the plurality of cells 12 are welded to the inner sealing ring 210 at each end 212, 214. Thus, the circular recuperator core 10 is effectively and efficiently formed in its predefined aligned configuration.

INDUSTRIAL APPLICABILITY

In use the manufacturing system 60 is actuated. The operator actuates one of the switches 194 and the cylinder 196 positions the lower or inner chucking portion 70 in the lower position 72 and in the retracted position 126. The operator positions the inner sealing ring 210 about the contacting surface 134 of the plurality of segmented members 132 of the multipiece cylindrical member 132. The first end 212 of the inner sealing ring 210 is aligned with the first end 138 of the multipiece cylindrical member 130 and a switch 194 is actuated to cause the cylinder 129 to move the lower or inner chucking portion 70 into the expanded position 128. Thus, the first end 212 of the inner sealing ring 210 and the first end 138 of the multipiece cylindrical member 130 are aligned. And with the contacting surface 134 of the multipiece cylindrical members 130 contacting the inner sealing ring 210, the concentricity of the inner sealing ring 210 is maintained.

Next, the operator actuates one of the switches 194 and the lower or inner chucking portion 70 with the inner sealing ring 210 attached thereto causes the cylinder 196 to move the lower or inner chucking portion 70 into the upper position 74. With the inner sealing ring 210 positioned about the axis "A", the operator actuates one of the switches 194 and the upper portion 80 in the first position 110, the loading position 84, with the first side 112 up and the space "S" at a maximum randomly positions a predetermined quantity of the plurality of the cells 12 from the tube 64 and positions the plurality of cells 12 into the stacking portion 82 of the upper portion 80.

The operator actuates one of the switches 194 and the plurality of cylinders 120 move the plurality of segments 200 of the upper portion 80 into the clamping position 86. The plurality of segments 200 are moved into the first of the clamping positions being the low pressure clamping position 88. The space "S" is reduced and the operator aligns the edges 36 of the plurality of cells 12. Additionally, the plurality of cells 12 are further aligned to prevent overlap of one to another. If necessary, a soft hammer can be used to align the plurality of cells 12.

After initial alignment, the operator actuates one of the switches 194 and the plurality of cylinders 120 cylinders 120 move the plurality of segments 200 of the upper portion 80 into the second of the clamping positions 86 being the medium pressure clamping position. Thus, the space "S" is further reduced and the operator again aligns the edges 36 of the plurality of cells 12. Again, the plurality of cells 12 are further aligned to prevent overlap of one to another. With the plurality of cells 12 partially nested within the assembly station 66, it is most likely necessary to employ the soft hammer to align the plurality of cells 12.

After the plurality of cells 12 have been aligned by the operator with the medium pressure clamping position of the clamping position 86, the operator actuates one of the switches 194 and the plurality of cylinders 120 cylinders 120 move the plurality of segments 200 of the upper portion 80 into the third of the clamping positions 86 being the high pressure clamping position. Thus, the space "S" is reduced to a minim. At this stage of the operation the edges 36 of the plurality of cells 12 should be maintained in alignment. If the plurality of cells 12 are not aligned, the operator must start over with the process, low pressure clamping, medium pressure clamping and high pressure clamping assuring that the plurality of cells 12 are properly nested and aligned within the assembly station 66.

With the plurality of cells 12 properly nested and aligned, the first end 212 of the inner sealing ring 210 is welded to the plurality of cells 12. The operator actuates one of the switches 194 and the cylinder 129 moves the lower or inner chucking portion 70 into the retracted position 126 and the cylinder 196 moves the lower or inner chucking portion 70 is moved to the lower position 72.

The operator actuates one of the switches 194 and the pair of motors 118 moves the upper portion 80 into the second position 114 with the second side 116 up. The second end 214 of the inner sealing ring 210 is welded to the plurality of cells 12.

The operator actuates one of the switches 194 and the plurality of cylinders 120 move the stacking portion 82 of the upper portion 80 into the loading position 84. The operator removes the welded circular recuperator core 10 from the assembly fixture 66 and positions the finished welded circular recuperator core 10 into the tube 102 at the output end 110 of the system 60. If desirable, prior to removing the welded circular recuperator core 10 from the assembly fixture 66, the retainer or plurality of retainers are positioned about the "OD" outer diameter portion of the finished circular recuperator core 10.

What is claimed is:

1. A method of aligning a plurality of cells forming a recuperator core said recuperator core having a circular configuration defining an axis "A" about which is formed an inner diameter "ID" and an outer diameter "OD", said method of aligning comprising the steps of:

positioning an inner sealing ring about an inner chucking portion;

aligning a first end of said inner sealing ring with an end of said inner chucking portion;

expanding said inner chucking portion into an expanded position maintaining said first end of said inner sealing ring flush with said end of said inner chucking portion, said inner sealing ring being centered about said axis "A";

positioning an upper portion about said inner chucking portion, said upper portion being in a loading position;

positioning a preestablished quantity of said plurality of cells within said upper portion in a preestablished relationship; and moving said upper portion from said loading position to a clamping position and properly aligning each of said plurality of cells one to another.

2. The method of aligning a plurality of cells of claim 1 wherein said step of expanding said inner chucking portion into an expanded position includes a plurality of contacting surfaces being in contacting relationship with an inner diameter of said inner sealing ring.

3. The method of aligning a plurality of cells of claim 2 wherein said plurality of contacting surfaces includes at least three contacting surfaces.

4. The method of aligning a plurality of cells of claim 1 wherein said step of positioning an upper portion about said inner chucking portion and said upper portion being in a loading position includes said upper portion having a plurality of segments being spaced apart defining a space "S" therebetween each of said plurality of segments.

5. The method of aligning a plurality of cells of claim 1 wherein said step of positioning a preestablished quantity of said plurality of cells within said upper portion in a preestablished relationship includes each of said plurality of cells having a recipient inlet passage therein and a recipient outlet passage and said respective recipient inlet passages and said respective recipient outlet passages being aligned one to another of each of said plurality of cells.

6. The method of aligning a plurality of cells of claim 1 wherein said step of moving said upper portion from said loading position to said clamping position includes a plurality of clamping positions.

7. The method of aligning a plurality of cells of claim 6 wherein said plurality of clamping positions includes a ow pressure clamping position, a medium pressure clamping position and a high pressure clamping position.

8. The method of aligning a plurality of cells of claim 1 wherein said step of moving said upper portion from said loading position to said clamping position includes progressively moving said upper portion to a low pressure clamping position and aligning said plurality of cells, moving said upper portion to a medium pressure clamping position and aligning said plurality of cells, and moving said upper portion to a high pressure clamping position.

9. The method of aligning a plurality of cells of claim 8 wherein said step of moving said upper portion to a high pressure clamping position defines said outer diameter "OD".

* * * * *